Jan. 19, 1926.

R. CRABTREE 1,569,913

HARROW

Filed Feb. 1, 1924          2 Sheets-Sheet 1

Robert Crabtree,
INVENTOR
BY Victor J. Evans
ATTORNEY

Jan. 19, 1926.  1,569,913
R. CRABTREE
HARROW
Filed Feb. 1, 1924  2 Sheets-Sheet 2
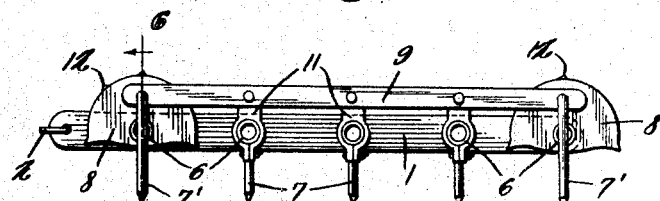
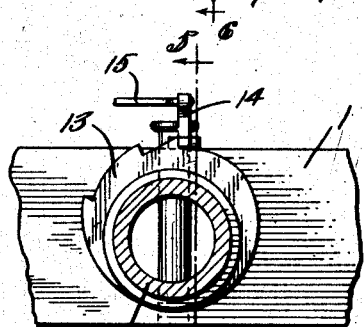
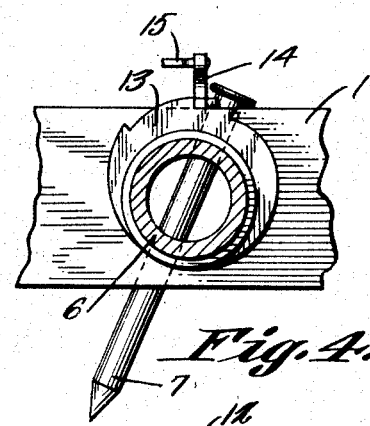
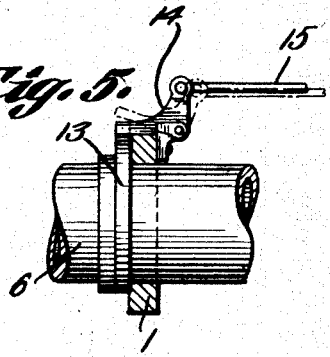
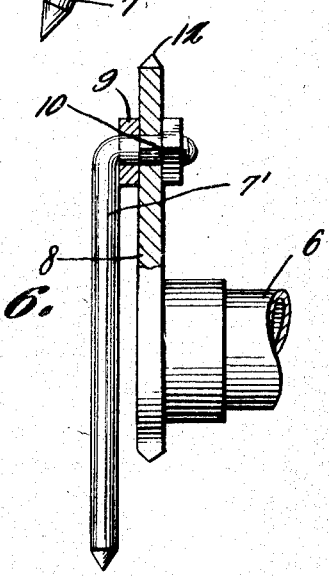
Robert Crabtree,
INVENTOR
BY Victor J. Evans
ATTORNEY
WITNESS:
P. T. Hickey Patented Jan. 19, 1926.

1,569,913

UNITED STATES PATENT OFFICE.

ROBERT CRABTREE, OF FORBES, NORTH DAKOTA.

HARROW.

Application filed February 1, 1924. Serial No. 689,965.

*To all whom it may concern:*

Be it known that I, ROBERT CRABTREE, a citizen of the United States, residing at Forbes, in the county of Dickey and State of North Dakota, have invented new and useful Improvements in Harrows, of which the following is a specification.

This invention relates to a harrow, the general object of the invention being to provide the harrow with rotary parts for carrying the teeth with means for permitting the parts to rotate to free the teeth of trash and the like.

Another object of the invention is to provide runners with means for moving them into engagement with the ground when the harrow is to be transported from one field to another or is to travel along a road.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is an edge view.

Figure 3 is a section on line 3—3 of Figure 1.

Figure 4 is a similar view but showing the parts in a different position.

Figure 5 is a section on line 5—5 of Figure 3.

Figure 6 is a section on line 6—6 of Figure 2.

Figure 1:
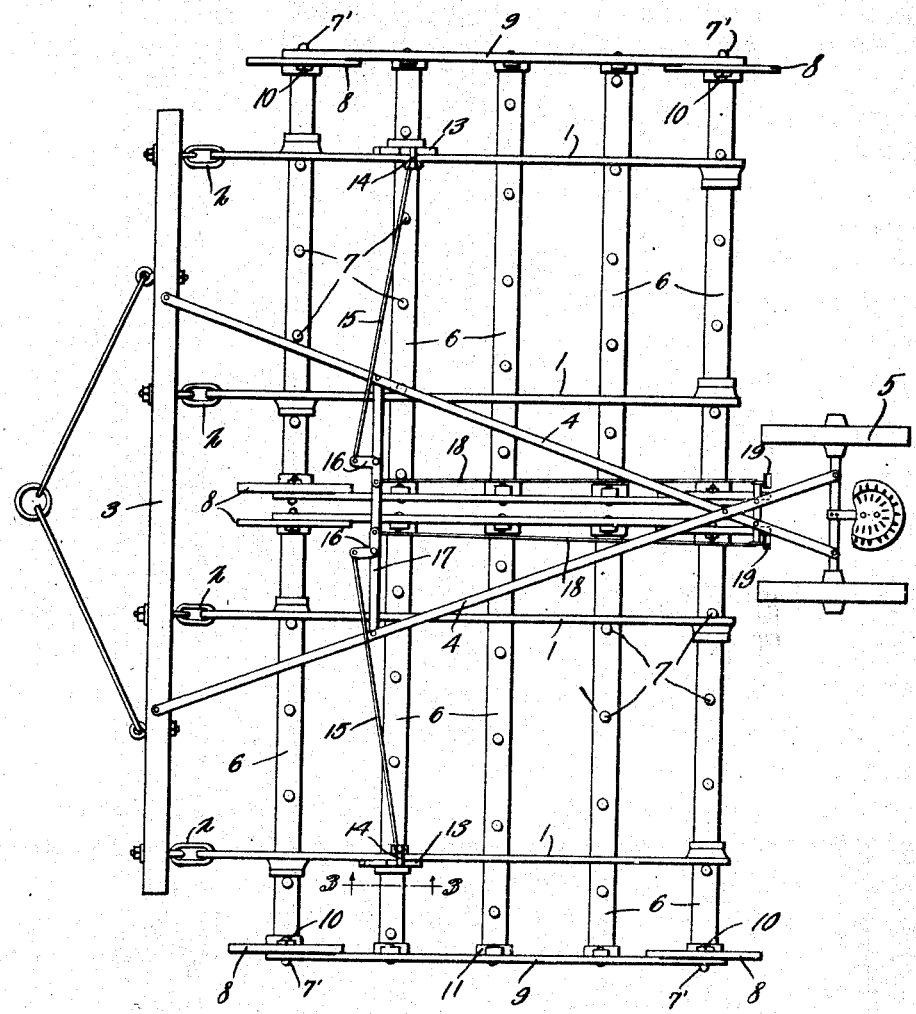
Figure 1 is a plan view of a harrow constructed in accordance with my invention.

In these views, 1 indicates a plurality of bars which are connected by the links 2 with the draw bar 3. This draw bar is connected by the braces 4 with the cart 5. Pipes 6 are rotatably supported by each pair of bars 1. Each pair of bars 1, with their associated parts, form a section of the harrow, the drawings showing a two-section harrow. These pipes carry the spikes or teeth 7 which pass through holes in the pipes and a substantially semi-circular plate 8 is connected with each end of the outer pipes. These plates carry the spikes or teeth 7'. A bar 9 connects the two plates at each side of the section together, a nut 10 being placed on each spike to hold the parts in position. Each spike 7' is provided with a square part which engages a square hole in each plate 8 so that the spike and plate must move together. The bar 9 is pivotally connected with the plate by a round part of the spike 7', as shown in Figure 6. The other pipes are connected with the bars 9 by the clips 11 which are clamped to the ends of the pipes and which are suitably fastened to the bars 9. Thus all the pipes will be rotated in unison. The plates 8 are provided with the pointed projections 12 for insuring their rotary movement when they are in contact with the ground. The second pipe of each section has secured thereto a ratchet member 13, the teeth of which are adapted to be engaged by the pawl 14 which is pivoted to one of the bars 1 and which is connected by a rod 15 with a bell crank 16 pivoted to a cross piece 17 connected with the braces 4 and a rod 18 connects each bell crank with a foot pedal 19 arranged adjacent the cart so that it can be actuated by a person sitting on the seat of the cart. The teeth of the ratchet member 13 are so arranged that they will hold the parts in a position with the spikes in either a vertical position, as shown in Figure 3, an inclined position as shown in Fgure 4 or in a horizontal position so that the teeth will not contact with the ground and in this latter position the plates will act as runners for supporting the frame off the ground and thus enable the implement to be transported from place to place without the teeth or spikes engaging the ground. By keeping the feet pressed upon the pedals the pawls will be kept out of contact with the ratchet member so that the pipes will continue to rotate through contact of the spikes and plates with the ground and thus free the harrow of trash and other material picked up by the teeth.

From the foregoing it will be seen that I have provided a harrow of simple construction and one in which the teeth can be set vertically or at an incline as desired. When not in use the teeth can be held in a horizontal position with the runners engaging the ground, thus enabling the harrow to be transported along roads and the like without the teeth engaging the surface. If trash collects on the teeth this can be easily removed by holding the pedal down with the foot and thus permitting the pipes to rotate to discharge the trash.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A harrow of the class described comprising a frame, bars rotatably mounted in the frame, spikes passing through the bars, semi-circular plates on the ends of the outer bars, a spike carried by each plate, clips connected with the ends of the inner bars, connecting strips connected with the clips and the plates for causing the bars to rotate in unison, the strips being connected with the plates by the spikes of said plates, ratchet means connected with one of the bars for holding said bars in a position with the spikes raised and the plates engaging the ground to act as runners, or for holding the bars in a position with the spikes vertical or inclined and manually operated means for actuating the ratchet means and for holding them in inactive position to permit the bars to rotate to free the spikes of trash.

In testimony whereof I affix my signature.

ROBERT CRABTREE.